US011108569B2

(12) United States Patent
Jin et al.

(10) Patent No.: US 11,108,569 B2
(45) Date of Patent: Aug. 31, 2021

(54) RENEWABLE TRAITOR TRACING

(71) Applicant: INTERNATIONAL BUSINESS MACHINES CORPORATION, Armonk, NY (US)

(72) Inventors: Hongxia Jin, San Jose, CA (US); Jeffrey B. Lotspiech, Henderson, NV (US); Sigfredo I. Nin, Morgan Hill, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/352,298

(22) Filed: Nov. 15, 2016

(65) Prior Publication Data

US 2017/0063558 A1    Mar. 2, 2017

Related U.S. Application Data

(63) Continuation of application No. 11/230,022, filed on Sep. 19, 2005, now Pat. No. 9,520,993.

(51) Int. Cl.
*H04L 9/32* (2006.01)
*H04L 9/08* (2006.01)
*H04L 29/06* (2006.01)

(52) U.S. Cl.
CPC ............ *H04L 9/3268* (2013.01); *H04L 9/083* (2013.01); *H04L 9/0891* (2013.01);
(Continued)

(58) Field of Classification Search
CPC ..... H04L 9/08–0891; H04L 9/32–3268; H04L 63/06–068; H04L 2209/60–606
See application file for complete search history.

(56) References Cited

U.S. PATENT DOCUMENTS

| 4,075,435 A | 2/1978 | Eppler, Jr. |
| 4,207,440 A | 6/1980 | Schiffman |

(Continued)

FOREIGN PATENT DOCUMENTS

| EP | 0641103 A2 | 3/1995 |
| JP | 09354401 | 7/1999 |

(Continued)

OTHER PUBLICATIONS

S. C. -. Huang and Ding-Zhu Du, "New constructions on broadcast encryption key pre-distribution schemes," Proceedings IEEE 24th Annual Joint Conference of the IEEE Computerand Communications Societies., 2005, pp. 515-523 vol. 1, doi: 10.1109/INFCOM.2005.1497919. (Year: 2005).*

(Continued)

*Primary Examiner* — Madhuri R Herzog
(74) *Attorney, Agent, or Firm* — Erik Huestis; Stephen Kenny; Foley Hoag, LLP (57) ABSTRACT

A system, method, and computer program product to renewably prevent traitors in a broadcast encryption system from re-using compromised keys. A license agency assigns individual receivers a set of Sequence Keys preferably at manufacture, and assigns Sequence Key Blocks (SKBs) to protected content files to be distributed. The files may be distributed on prerecorded media and typically include several file modifications. The particular modifications in a pirated version of a file can help identify which traitors contributed to its theft. SKBs assigned to new files distributed after traitors have been identified cannot be usefully processed using the compromised keys employed in previous content piracy. Innocent receivers that happen to have compromised key(s) in common with traitors can use a replacement uncompromised Sequence Key from the set to (Continued)

usefully decrypt content. Traitors will however step through all their Sequence Keys without reaching one that will work.

20 Claims, 7 Drawing Sheets

(52) U.S. Cl.
CPC .......... *H04L 9/3247* (2013.01); *H04L 63/061* (2013.01); *H04L 2209/601* (2013.01); *H04L 2209/606* (2013.01)

(56) References Cited

U.S. PATENT DOCUMENTS

| | | |
|---|---|---|
| 4,423,287 A | 12/1983 | Zeidler |
| 4,512,020 A | 4/1985 | Krol et al. |
| 4,605,820 A | 8/1986 | Campbell, Jr. |
| 4,665,326 A | 5/1987 | Domogalla |
| 4,694,491 A | 9/1987 | Home et al. |
| 5,117,358 A | 5/1992 | Winkler |
| 5,200,999 A | 4/1993 | Matyas et al. |
| 5,241,597 A | 8/1993 | Bright |
| 5,272,752 A | 12/1993 | Myers et al. |
| 5,345,505 A | 9/1994 | Pires |
| 5,538,773 A | 7/1996 | Kondo |
| 5,574,785 A | 11/1996 | Ueno et al. |
| 5,592,552 A | 1/1997 | Fiat |
| 5,651,064 A | 7/1997 | Newell |
| 5,675,649 A | 10/1997 | Brennan et al. |
| 5,748,736 A | 5/1998 | Mittra |
| 5,758,068 A | 5/1998 | Brandt et al. |
| 5,812,670 A | 9/1998 | Micali |
| 5,881,287 A | 3/1999 | Mast |
| 5,917,910 A | 6/1999 | Ishiguro et al. |
| 5,949,885 A | 9/1999 | Leighton |
| 6,049,878 A | 4/2000 | Caronni et al. |
| 6,084,969 A | 7/2000 | Wright et al. |
| 6,098,056 A | 8/2000 | Rusnak et al. |
| 6,118,873 A | 9/2000 | Lotspiech et al. |
| 6,138,119 A | 10/2000 | Hall et al. |
| 6,145,111 A | 11/2000 | Crozier et al. |
| 6,222,923 B1 | 4/2001 | Schwenk |
| 6,247,127 B1 | 6/2001 | Vandergeest |
| 6,263,435 B1 | 7/2001 | Dondeti et al. |
| 6,285,774 B1 | 9/2001 | Schumann et al. |
| 6,285,991 B1 | 9/2001 | Powar |
| 6,289,455 B1 | 9/2001 | Kocher et al. |
| 6,370,272 B1 | 4/2002 | Shimizu |
| 6,373,948 B1 | 4/2002 | Wool |
| 6,381,367 B1 | 4/2002 | Ryan |
| 6,397,329 B1 | 5/2002 | Aiello et al. |
| 6,556,679 B1 | 4/2003 | Kato et al. |
| 6,560,340 B1 | 5/2003 | Akins, III et al. |
| 6,587,826 B1 | 7/2003 | Laneman et al. |
| 6,629,243 B1 | 9/2003 | Kleinman et al. |
| 6,684,331 B1 | 1/2004 | Srivastava |
| 6,690,795 B1 | 2/2004 | Richards |
| 6,691,149 B1 | 2/2004 | Yokota et al. |
| 6,839,436 B1 | 1/2005 | Garay et al. |
| 6,888,944 B2 | 5/2005 | Lotspiech et al. |
| 6,891,950 B1 | 5/2005 | Oomori et al. |
| 6,947,563 B2 | 9/2005 | Fagin et al. |
| 7,010,125 B2 | 3/2006 | Lotspiech et al. |
| 7,013,010 B2 | 3/2006 | Ripley |
| 7,039,803 B2 | 5/2006 | Lotspiech et al. |
| 7,043,024 B1 | 5/2006 | Dinsmore et al. |
| 7,228,437 B2 | 6/2007 | Spagna et al. |
| 7,305,711 B2 | 12/2007 | Ellison et al. |
| 7,310,821 B2 | 12/2007 | Lee et al. |
| 7,340,602 B2 | 3/2008 | Serret-Avila |
| 7,392,381 B2 | 6/2008 | Traw et al. |
| 7,403,618 B2* | 7/2008 | Van Rijnsoever ... H04N 7/1675 348/E7.056 |
| 7,457,415 B2 | 11/2008 | Reitmeier et al. |
| 7,505,593 B2 | 3/2009 | Jin et al. |
| 7,523,307 B2 | 4/2009 | Lotspiech et al. |
| 7,545,943 B2 | 6/2009 | Kamibayashi et al. |
| 2001/0029581 A1 | 10/2001 | Knauft |
| 2001/0047502 A1 | 11/2001 | Hattori et al. |
| 2001/0052073 A1 | 12/2001 | Kern et al. |
| 2002/0044320 A1 | 4/2002 | Pfeiffer et al. |
| 2002/0076205 A1 | 6/2002 | Asada |
| 2002/0083319 A1 | 6/2002 | Ishiguro et al. |
| 2002/0085715 A1* | 7/2002 | Ripley ............ G11B 20/00086 380/202 |
| 2002/0090090 A1 | 7/2002 | Van Rijnsoever et al. |
| 2002/0133701 A1* | 9/2002 | Lotspiech ........ G11B 20/00086 713/163 |
| 2002/0141582 A1 | 10/2002 | Kocher et al. |
| 2002/0159593 A1 | 10/2002 | Sako et al. |
| 2002/0174366 A1 | 11/2002 | Peterka et al. |
| 2003/0051151 A1 | 3/2003 | Asano et al. |
| 2003/0142826 A1 | 7/2003 | Asano |
| 2003/0169885 A1 | 9/2003 | Rinaldi |
| 2003/0187534 A1 | 10/2003 | Suzuki et al. |
| 2003/0223579 A1 | 12/2003 | Kanter et al. |
| 2004/0109569 A1* | 6/2004 | Ellison ............. G11B 20/00086 380/277 |
| 2004/0111611 A1 | 6/2004 | Jin et al. |
| 2004/0128259 A1 | 7/2004 | Blakeley et al. |
| 2004/0133590 A1 | 7/2004 | Henderson et al. |
| 2004/0133794 A1 | 7/2004 | Kocher et al. |
| 2004/0153941 A1 | 8/2004 | Muratani |
| 2004/0202382 A1 | 10/2004 | Pilu |
| 2005/0131832 A1 | 6/2005 | Fransdonk |
| 2005/0141704 A1 | 6/2005 | Van Der Veen |
| 2005/0198679 A1 | 9/2005 | Baran et al. |
| 2005/0228988 A1 | 10/2005 | Traw et al. |
| 2006/0109985 A1* | 5/2006 | Lotspiech ............. H04L 9/0836 380/277 |
| 2007/0025694 A1 | 2/2007 | Takashima et al. |
| 2008/0022131 A1 | 1/2008 | Ueda et al. |

FOREIGN PATENT DOCUMENTS

| | | |
|---|---|---|
| JP | 2001382149 | 9/2002 |
| WO | 9716896 A1 | 5/1997 |
| WO | 9919822 A2 | 4/1999 |
| WO | 9933270 A1 | 7/1999 |
| WO | 0122406 A1 | 3/2001 |
| WO | 0178298 A1 | 10/2001 |
| WO | 0178299 A1 | 10/2001 |

OTHER PUBLICATIONS

Naor, Dalit, and Moni Naor. "Protecting cryptographic keys: The trace-and-revoke approach." Computer 36.7 (2003): 47-53. (Year: 2003).*
Advanced Access Content System (AACS), Pre-recorded Video Book, [online], Apr. 14, 2005, revision 0.90, http://www.aacsla.com/specifications/specs/AACS_Spec-Prerecorded_Video_0.90.pdf.
Toru Kambayashi et al., "Content Protection for SD Memory Card", Toshiba Review, Toshiba Corporation, Jun. 1, 2003, vol. 58, No. 6, pp. 32-35.
Makoto Tatebayashi et al., "Content Protection System for Recordable Media", Proceedings of the 2000 IEICE Electronics Society Conference, IEICE, Sep. 7, 2000, pp. 367-368.
Translation of portions of Japan Office Action and Japan Office Action dated Dec. 7, 2010.
Yoshida et al., "A Subscriber-Excluding and Traitor-Tracing Broadcast Distribution Systems" IEICE Trans. Fundamentals, vol. E84-A. No. 1, Jan. 1, 2001, pp. 247-255.
Lin et al., "Advances in Digital Video Content Protection" Proc. of the IEEE, v.93, n. 1, Jan. 2005, pp. 171-183.
D. Boneh et al., "An Efficient Public Key Traitor Tracing Scheme" Proceedings CRVPTO '99 LNCS; vol. 1666, Springer-Verlag, i-iv, 1999, pp. 338-353.
An Overlap-Add Technique Based on Waveform Similarity (WSOLA) for High Quality Time-Scale; Modification of Speech, Proceedings of Eurospeech '93. Berlin, Sep. 21-23, 1993.

(56) References Cited

OTHER PUBLICATIONS

Silverberg et al., "Applications of List Decoding to Tracing Traitors", IEEE Transactions on Information Theory vol. 49, No. 5, May 2003, pp. 1312-1318.
Bruce Schneier, "Applied Cryptography," 1996, John Wiley & Sons, 2nd e.d, p. 270.
Pfitzmann et al., "Asymmetric Fingerprinting for Larger Collusions", (c) 1997, ACM Press, pp. 151-160.
A. Fiat et al., "Broadcast Encryption," CRYPTO 1993, Proc. of the 13th annual Int'l. cryptology Conf.; Santa Barbara, CA 1994, Lecture notes in Comp. Sci., v.773, pp. 480-491.
D. Boneh et al., "Collusion-Secure Fingerprinting for Digital Data", IEEE Transactions on Information Theory ; vol. 44, No. 5, 1998, pp. 1897-1905.
C. Dwork et al., "Digital Signets: Self-Enforcing Protection of Digital Information", 28th Symposium on the Theory of Computation, 1996, pp. 489-498.
Fiat et al., "Dynamic Traitor Tracing", International Cryptology Conference, 19th, Santa; Barbara. Proceedings of CRYPTO '99, Advances in Cryptology, LNCS, vol. 1666, Aug. 1999, pp. 354-371.
O. Berkman et al., "Efficient Dynamic Traitor Tracing", Proceedings of the 11th ACM-SIAM Symph. on Discrete Algorithms (SODA), 2000, pp. 586-595.
E. Gafni et al., "Efficient Methods for Integrating Traceability and Broadcast Encryption", CRYPTO '99, Springer-Verlag LNCS 1666, 1999, pp. 372-387.
M. Naor et al., "Efficient Trace and Revocaion Schemes", Financial Cryptography 2000, LNCS 1962, 2001, pp. 1-20.
Stephen Wicker, "Error Control Systems for Digital Communication and Storage", (c) 1995 by Prentice-Hall Inc., p. 176, paragraph 2 and p. 188, p. 4.
Fernandez-Munoz et al., "Fingerprinting Schemes for the Protection of Multimedia Distribution Rights", Upgrade, Security in a-Commerce, v.III, n.6, Dec. 2002, pp. 36-40.
A. Barg et al., "Good Digital Fingerprinting Codes", IEEE Transactions on Information Theory, Proceedings of Information Theory, Proceedings of Symposium on. Information Theory, Jun. 25-30, 2000, Sorrento, Italy, p. 161.
Alfred Menezes et al., "Handbook of Applied Cryptography", CRC Press LLC, 1997. pp. 576-577.
McGrew et al., "Key Establishment in Large Dynamic Groups Using One-Way Function Trees", Submitted to IEEE Transactions on Software Engineering, May 1998.
D. Waller et al., "Key Management for Multicast: Issues and Architectures", National Security Agency, Jun. 1999, pp. 1-19.
M. Abdalla et al., "Key Management for Restricted Multicast Using Broadcast Encryption", IEEEfACM Transactions on Networking, IEEE Inc. New York, U.S. vol. 8, Aug. 2000, pp. 443-454.
Canetti et al., "Multicast Security: A Taxonomy and Some Efficient Constructions", Proc. of INFOCOM. vol. 2, New York, Mar. 1999, pp. 708-716.
Adi Shamir, "On the Generation of Cryptographically Strong Pseudorandom Sequences", ACM Transactions on Computer Systems, vol. 1, No. 1, Feb. 1983, pp. 38-44.
Ramamritham et al., "Privilege Transfer and Revocation in a Port-Based System", IEEE Transactions on Software Engineering vol. SE-12, Issue 5, May 1986, pp. 635-648.
M. Naor et al., "Revocation and Tracing Schemes for Stateless Receivers", Jul. 2001, USA, pp. 1-34.
Wong et al., "Secure Group Communications Using Key Graphs", Proceedings of ACM SIGCOMM, Sep. 1998, Canada, pp. 1-12.
Kocher et al., "Self-Protecting Digital Content", Technical Report from the CRI Content Security Research Initiative, Cryptography Research, Inc. (CRI), 2002-200.
Safavi-Naini et al., "Sequential Traitor Tracing", CRYPTO 2000, LNCS vol. 1880,2000, pp. 316-332.
M. Naor et al., "Threshold Traitor Tracing", CRYPO '98, LNCS vol. 1462, 1998, pp. 502-517.
D. Malah, "Time-Domain Algorithms for Harmonic Bandwidth Reduction and Time Scaling of Speech Signals", Submitted to IEEE, 1979, pp. 121-133.
M. Naor et al., "Tracing Traitors", IEEE Transactions on Information Theory, vol. 46, No. 3, May 2000, pp. 893-910.
Blundo et al., "Trade-Offs Between Communication and Storage in Unconditionally Secure Schemes for Broadcast Encryption and Interactive Key Distribution", Advances in Cryptology, Crypto '96. Proceedings of the 16th annual International Cryptology Cont, Santa Barbara, U.S. Aug. 1996, pp. 387-400.
H. Jin et al., "Traitor Tracing for Prerecorded and Recordable Media", ACM, DRM '04, Oct. 25, 2004, pp. 83-90.
Birgit Pfitzmann, "Trials of Traced Traitors", Workshop on Information Hiding, Cambridge, UK, LNCS, vol. 1174, Springer-Verlag, 1996, pp. 1-16.
Canetti et al., "Efficient Communication-Storage Tradeoffs for Multicast Encryption", Eurocrypt 1999, pp. 459-474.

\* cited by examiner

| Bit<br>Byte | 7 | 6 | 5 | 4 | 3 | 2 | 1 | 0 |
|---|---|---|---|---|---|---|---|---|
| 0 | \multicolumn{8}{c}{Record Type: $03_{16}$} |
| 1 | | | | | | | | |
| 2 | \multicolumn{8}{c}{Record Length: $000014_{16}$} |
| 3 | | | | | | | | |
| 4 | | | | | | | | |
| ... | \multicolumn{8}{c}{Nonce number (X)} |
| 19 | | | | | | | | |

FIG. 5

| Bit | 7 | 6 | 5 | 4 | 3 | 2 | 1 | 0 |
|---|---|---|---|---|---|---|---|---|
| 0 | colspan="8" | Record Type: $01_{16}$ |||||||
| 1 | colspan="8" | Record Length |||||||
| 2 | | | | | | | | |
| 3 | | | | | | | | |
| 4 | colspan="8" | Reserved |||||||
| ... | | | | | | | | |
| 7 | | | | | | | | |
| 8 | colspan="8" | Column |||||||
| 9 | | | | | | | | |
| 10 | colspan="8" | Generation: $0001_{16}$ |||||||
| 11 | | | | | | | | |
| 12 | colspan="8" | Reserved |||||||
| ... | | | | | | | | |
| 19 | | | | | | | | |
| 20 | colspan="8" | Encrypted Variant Data for Row 0 ($D_{ke\_0}$) |||||||
| ... | | | | | | | | |
| 29 | | | | | | | | |
| 30 | colspan="8" | Encrypted Variant Data for Row 1 ($D_{ke\_1}$) |||||||
| ... | | | | | | | | |
| 39 | | | | | | | | |
| 40 | colspan="8" | . |||||||
| ... | colspan="8" | . |||||||
| Length-1 | colspan="8" | . |||||||

Encrypted Key Data (spans rows 20 through Length-1)

FIG. 6

| Bit | 7 | 6 | 5 | 4 | 3 | 2 | 1 | 0 |
|---|---|---|---|---|---|---|---|---|
| 0 | Record Type: $82_{16}$ ||||||||
| 1 | Record Length ||||||||
| 2 | ||||||||
| 3 | ||||||||
| 4 | $DEADBEEF_{16}$ (encrypted) ||||||||
| ... | ||||||||
| 7 | ||||||||
| 8 | Column (encrypted) ||||||||
| 9 | ||||||||
| 10 | Generation: $0001_{16}$ (encrypted) ||||||||
| 12 | Reserved ||||||||
| ... | ||||||||
| 19 | ||||||||
| 20 | Doubly Encrypted Variant Data for Row 0 ($D_{kde\_0}$) ||||||||
| ... | ||||||||
| 19 | ||||||||
| 30 | Doubly Encrypted Variant Data for Row 1 ($D_{kde\_1}$) ||||||||
| ... | ||||||||
| 39 | ||||||||
| 40 | . ||||||||
| ... | . ||||||||
| Length- | . ||||||||

Left labels: Encrypted Conditional Data ($D_{ce}$) spans rows 4–19; Doubly Encrypted Variant Data spans rows 20–Length-.

FIG. 7

| Bit<br>Byte | 7 | 6 | 5 | 4 | 3 | 2 | 1 | 0 |
|---|---|---|---|---|---|---|---|---|
| 0 | colspan="8" | Record Type: $02_{16}$ | | | | | | |
| 1 | colspan="8" | Record Length | | | | | | |
| 2 | | | | | | | | |
| 3 | | | | | | | | |
| 4 | colspan="8" | Signature Data | | | | | | |
| ... | | | | | | | | |
| Length-1 | | | | | | | | |

RENEWABLE TRAITOR TRACING

CROSS-REFERENCE TO RELATED APPLICATIONS

This invention is related to commonly-owned pending U.S. patent applications, each of which is hereby incorporated by reference, including: U.S. Ser. No. 09/770,877, filed Jan. 26, 2001, entitled "Method for Broadcast Encryption and Key Revocation of Stateless Receivers"; U.S. Ser. No. 09/771,239, filed Jan. 26, 2001, entitled "Method for Tracing Traitor Receivers in a Broadcast Encryption System"; U.S. Ser. No. 09/777,506, filed Feb. 5, 2001, entitled "Method for Assigning Encryption Keys"; U.S. Ser. No. 09/789,451, filed Feb. 20, 2001, entitled "Method for Assigning Encryption Keys"; U.S. Ser. No. 10/042,652, filed Jan. 8, 2002, entitled "Method for Ensuring Content Protection and Subscription Compliance"; and U.S. Ser. No. 10/315,395, filed Dec. 9, 2002, entitled "Method for Tracing Traitors and Preventing Piracy of Digital Content in a Broadcast Encryption System".

BACKGROUND

This invention relates to preventing piracy of digital content in a broadcast encryption system and more specifically to tracing traitors who may be colluding to redistribute such content and/or related decryption keys, and to renewably revoking compromised keys to prevent further use in gaining unauthorized access to content.

The widespread transition of data from analog format to digital format has exacerbated problems relating to unauthorized copying and redistribution of protected content. Flawless copies of content can be easily produced and distributed via the Internet or on physical media. This piracy is a major concern and expense for content providers; to this end, industry consortia such as The 4C Entity (<www.4centity.com>) and AACSLA (<www.aacsla.com>) have been formed. These groups are license agencies that provide content protection tools based on Content Protection for Recordable Media (CPRM) and Advanced Access Content System (AACS), respectively. CPRM is a technology developed and licensed by the 4C group, comprising IBM, Intel, Matsushita, and Toshiba, to allow consumers to make authorized copies of commercial entertainment content where the copyright holder for such content has decided to protect it from unauthorized copying. AACS is a follow-on technology for the same purpose, under development by a group comprising IBM, Intel, Matsushita, Toshiba, Sony, Microsoft, Warner Brothers, and Disney.

CPRM and AACS protected files are encrypted with a key that is specific to a Media Identifier on their original storage medium (such as a DVD or CD-ROM etc.), so simply copying the content to another storage medium does not break the protection. CPRM also adds a Media Key Block (MKB) to the medium. The MKB is a file containing a very large number of keys. Each individual compliant device is assigned a set of unique Device Keys that allow it to obtain the Media Key from the MKB, that is then combined with the Media Identifier and other values to derive the keys used to decrypt the protected content. Details of the CPRM and AACS technology are provided in the applications incorporated by reference and are also available from 4C and AACS.

Fundamentally, the AACS protection depends on the interaction between Device Keys and the tree-based Media Key Block, which allows unlimited, precise cryptographic revocation of compromised devices without danger of collateral damage to innocent devices. Because of the inherent power of the revocation of the AACS system, it is possible that attackers may forgo building clones or non-compliant devices and instead devote themselves to attacks where they try to hide the underlying compromised device(s). These attacks are both more expensive and more legally risky for the attackers, because the attacks require them to have an active server serving either content keys or the content itself, on an instance-by-instance basis.

In addition to conventional CD-ROMs and DVDs, a new type of home consumer device for digital content management has been enabled by the advent of inexpensive, large-capacity hard disks. A movie rental box receives digital movies from some inexpensive source of data, usually a broadcast source (whether terrestrial or satellite-based). The movies are stored on the hard disk, so that at any moment the hard disk contains, for example, the hundred hottest movies in the rental market. The consumer selects and plays a particular movie, and the movie rental box periodically calls a clearing center and reports the consumer's content usage for billing purposes; the box may also acquire new decryption keys during this call.

The most serious attack against these new devices is likely to be the so-called "anonymous" attack, wherein a user or a group of users purchase rental movies from legitimate movie rental boxes that have been instrumented so that the protected content and/or the decryption keys can be captured and redistributed, often over the Internet. This attack is the most urgent concern of the movie studios that are investigating content protection technology. One solution to the problem is to differently watermark and differently encrypt each movie for each authorized movie rental box, so that if a movie is pirated, the watermarking and encryption information would uniquely identify the compromised box. Alas, this solution is not feasible because of the excessive computing effort and transmission bandwidth required to prepare and transmit individualized movies. The distribution system is economical only if the movies can be distributed over broadcast channels, i.e. where every receiver gets substantially the same data at the same time.

The approach known in the art as "tracing traitors" may be used to solve the problem. In one particular instance of this approach, an original version of each movie file is augmented before being broadcast. Specifically, the file that is actually broadcast has had at least one critical file segment replaced by a set of segment variations. Each file segment variation is differently encrypted and preferably also differently watermarked prior to encryption, although the entire file may be watermarked as well. All the variations in one segment are identical for viewing purposes though digitally different. A particular receiver is preferably given the cryptographic key to decrypt only one of the variations in each segment. All legitimate receivers with valid decryption keys can play the content, but probably through different segment combinations. If the receiver is compromised and is used to illegally rebroadcast either the keys or the segments themselves, it is possible to deduce which receiver or receivers have been compromised.

The tracing traitors approach has not been widely used in practice to date because previous implementations required unreasonable amounts of bandwidth in the broadcast, due to the number of segments or variations required. However, U.S. Ser. No. 10/315,395, filed Dec. 9, 2002, entitled "Method for Tracing Traitors and Preventing Piracy of Digital Content in a Broadcast Encryption System" teaches a method of distributing protected content that combats piracy and enables identification and revocation of compromised receivers in a broadcast encryption system without excessive transmission bandwidth.

To recap, whether dealing with DVDs or set-top boxes or other distribution means, a traitor tracing scheme has two basic steps: assigning the keys to receiver devices to enable tracing, and then identifying the traitors for revocation. Efficient traitor tracing technologies directed to both these steps enable a license agency to more quickly identify traitors and to prevent piracy even by larger groups of colluding traitors.

However, what happens after a traitor has been identified and a particular compromised key or set of keys is revoked? The prior art is silent as to the aftermath of a single tracing and revocation. What if a traitor repeats the attack and additional content is pirated, and/or a new key or set of keys is compromised? A system is needed that allows innocent receiver devices to still calculate a correct cryptographic answer needed to allow content to be used, while at the same time preventing traitor devices from getting to such an answer.

BRIEF SUMMARY

It is accordingly an object of this invention to provide a method, system, and program product to renewably prevent traitors in a broadcast encryption system from re-using compromised keys to make use of protected distributed files.

The invention employs Sequence Keys and a Sequence Key Block (SKB) to extend the previous work on broadcast encryption and traitor tracing. The Sequence Keys are assigned by a license agency to individual playback devices preferably from a key matrix. The license agency also assigns SKBs to be used on prerecorded media, in a manner similar to that of the MKBs (Media Key Blocks) used in the CPRM system. Any compliant device can process the SKB and get the right decryption key and access the content correctly. In a preferred embodiment, successful processing of the SKB enables the device to properly use the set of variations assigned to it. When a traitor device is identified and its set of Sequence Keys is to be revoked, a new SKB is formulated and distributed on new media.

If a device has no compromised Sequence Keys, it decrypts protected content on the new media in a straightforward manner by calculating the correct decryption key, preferably for its assigned variations. If a device has a compromised Sequence Key, then that key is not used, but instead another Sequence Key from a set (in a preferred embodiment, the next key in a linked list) is selected and used if it too has not been compromised. If it has also been compromised, then another available key in the set is selected, and so forth. Thus, innocent devices are given multiple opportunities to find an unrevoked Sequence Key to usefully decrypt the protected content. This approach provides renewability of the Sequence Keys.

The formulation of the new SKB by the license agency assures that all of the Sequence Keys in particular devices that have been identified as traitors will be deemed compromised when those devices try to play the content on the new media. Thus a traitor device will step through all of its Sequence Keys without finding one that will usefully decrypt the protected content.

The invention may be employed with broadcast encryption systems using distribution means that may include computer networks, satellite networks, cable networks, television transmissions, and physical storage media. Files may comprise any kind of digital data sequence, including but not limited to text, audio, images, video, music, movies, multimedia presentations, operating systems, video games, software applications, and cryptographic keys.

The foregoing objects are believed to be satisfied by the embodiment of the present invention as described below.

DETAILED DESCRIPTION

Figure 1:
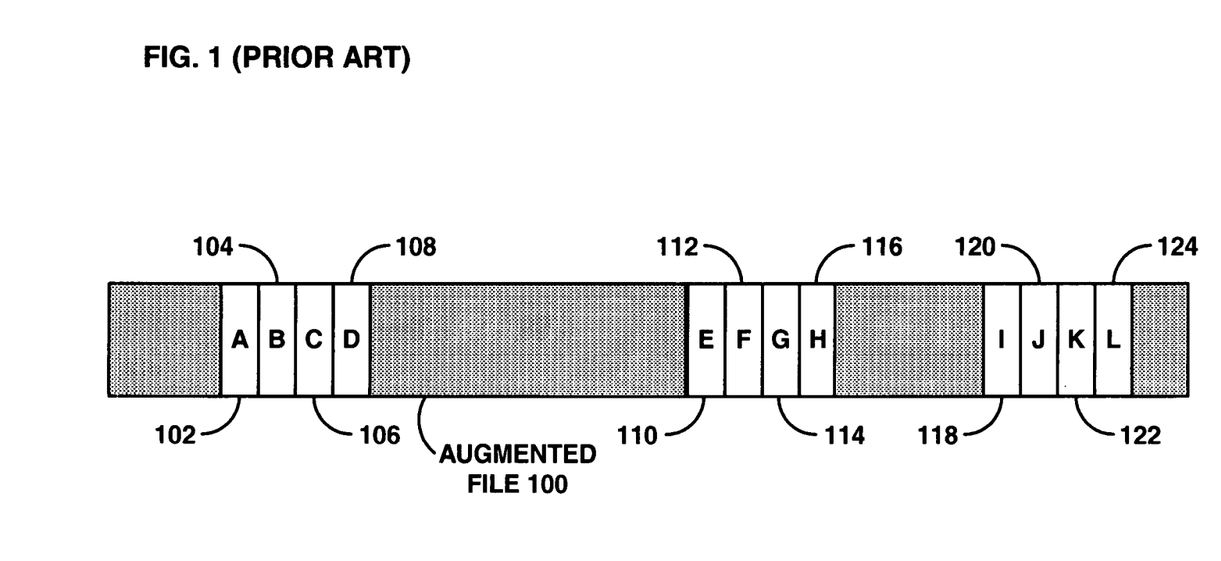
FIG. 1 is a prior art diagram of a modified distributed file.

Referring now to FIG. 1, a prior art diagram of a modified or augmented distributed file 100 is shown. This file is described in detail in U.S. Ser. No. 10/315,395, filed Dec. 9, 2002, entitled "Method for Tracing Traitors and Preventing Piracy of Digital Content in a Broadcast Encryption System", which was incorporated by reference herein. The augmented file 100 is the modified version of an original file that will actually be broadcast. The augmented file 100 includes sets of file variations that replaced critical file segments. For example, a first critical file segment has been replaced with variations 102, 104, 106, and 108, while a second critical file segment has been replaced with variations 110, 112, 114, and 116, and so forth. Each file segment variation is simply a copy of the particular corresponding critical file segment that has been differently watermarked and differently encrypted. Each entire file is also typically watermarked and encrypted in a broadcast encryption system. Each file segment variation is identified by a text designation in this application (e.g. A, B, C . . . etc.) for clarity, but in practice binary numbers are generally employed for this purpose.

The number of critical file segments and the number of file segment variations preferably employed depends on the properties of the file and its audience. For movies, one could select a single critical file segment and have several hundred file segment variations; however, attackers might simply choose to omit that single critical file segment in a pirated copy of the file, in hopes that viewers would not find such a glitch to be overly annoying. A pirated movie with say 15 missing critical 5-second scenes is probably going to be too annoying to any viewer for it to be of any commercial value. Thus, the illegally broadcast movies are either substantially disrupted or the attackers must incorporate some of their file segment variations, which will facilitate traitor tracing.

Each intended receiver of the broadcast requires variation selection information to choose a particular combination of file segment variations for each file. In terms of the movie rental box scenario, each movie rental box must know, for each movie, which set of variations to plug into the spaces where critical scenes existed in the original movie. The particular arrangement of unmodified file content and file segment variations within the augmented file 100 shown is not critical but is merely intuitive.

The variations facilitate traitor tracing in a commercially viable (i.e. low bandwidth overhead) manner. If a pirated version of a file is found, say on the Internet, the identity of the particular movie rental box (or boxes) that were used to create the pirated version is of keen interest to the broadcaster and/or content creator (e.g. copyright owners). The broadcaster and/or content creator may institute legal proceedings against the culprit, and would certainly want to refuse to send new decryption keys to the compromised boxes to prevent future thievery. If different boxes are assigned different combinations of file segment variations to use, an analysis of a pirated file can help determine which boxes were used as part of an anonymous attack.

In the event that all of the file segment variations in a redistributed version of a file match the combination of file segment variations assigned to only a single movie rental box, prior art systems would normally identify that box as being the source of the redistributed file. However, attackers are becoming increasingly sophisticated and may choose to employ a number of boxes to produce a pirated version of a file via collusion, wherein each box contributes some information or content used to produce the illicit copy after enough such information or content has been accumulated.

Figure 2:
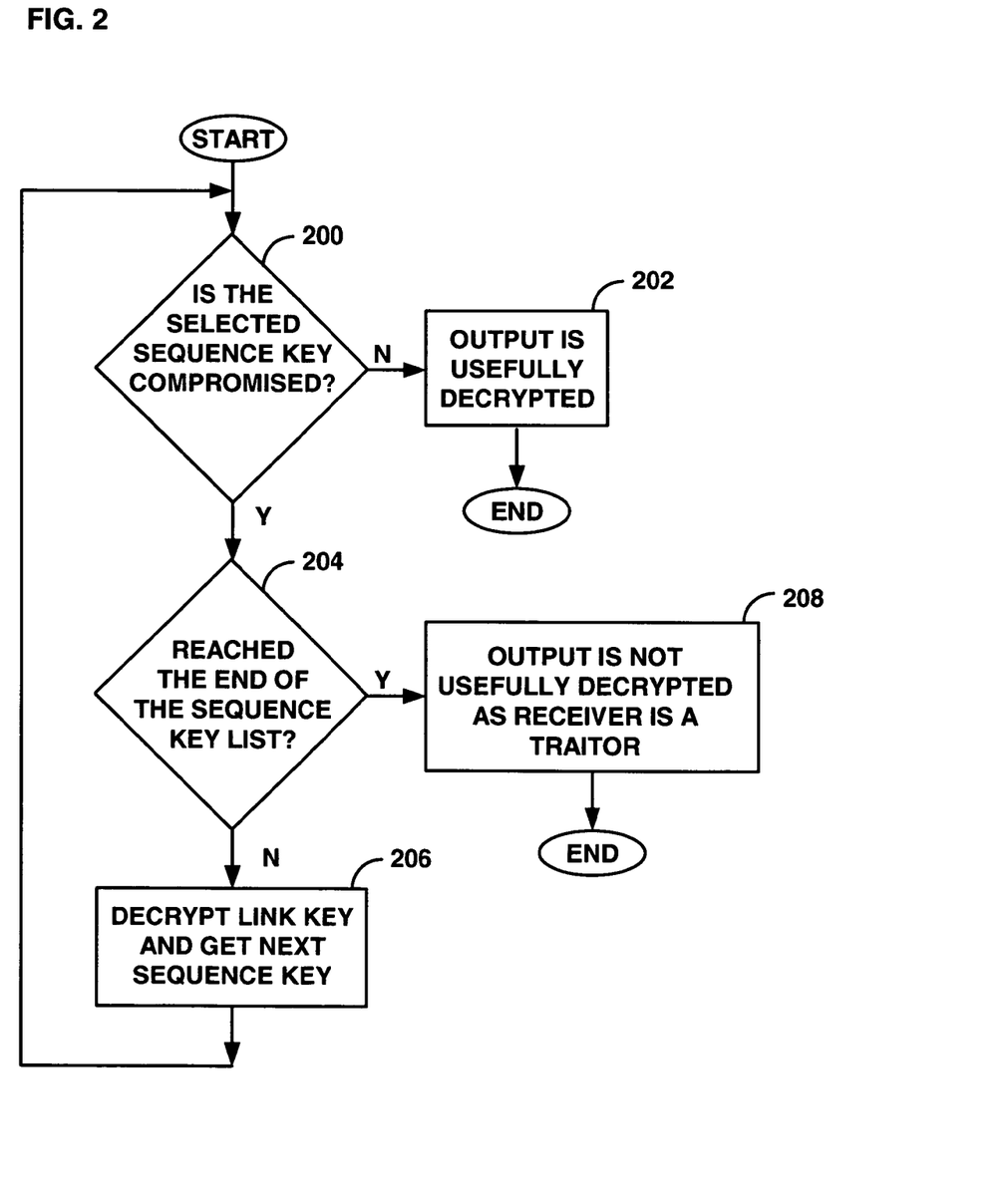
FIG. 2 is a flowchart of the basic operation of a preferred embodiment of the present invention.

Referring now to FIG. 2, a flowchart of the basic operation of a preferred embodiment of the present invention is shown. The formulation of the current SKB by the license agency assures that all of the Sequence Keys in particular devices that have been identified as traitors will be deemed compromised when those devices try to play the content on the new media. Attackers would prefer to use already-compromised Sequence Keys if they could, so that no new forensic information could be deduced by the license agency. Therefore, it is important that compromised keys no longer be usable by the attackers. The problem is that there are many thousands of devices that may have a single compromised key. Therefore, revocation of a single key is impractical.

On the other hand, since no two devices have very many keys in common, even if the system has been heavily attacked and a significant fraction of the Sequence Keys is compromised, all innocent devices will have many columns in which they have uncompromised keys. Thus it is possible to revoke a set of compromised keys rather than a single key. The purpose of the Sequence Key Block is to give all innocent devices a column they can use to calculate the correct answer, while at the same time preventing traitor devices (which have compromised keys in all columns) from getting to the same answer. In an SKB there are actually many correct answers, one for each variation in the content. For the purpose of explanation, however, it is helpful to imagine that a single SKB is producing a single answer, termed the output key. However, the invention is not limited to this case.

In step 200, the invention determines whether a selected Sequence Key has been compromised. In a preferred embodiment, Sequence Keys are examined one at a time, from the beginning of a given receiver's linked list of Sequence Keys to its end, though the invention is not limited to this case. If a selected Sequence Key has not been compromised, then the player is deemed not traitorous and proceeds in step 202 to usefully decrypt the protected content as an authorized device normally would, and the invention ends. However, if the selected Sequence Key has been compromised, then further processing is required to determine if the device is traitorous or is simply an innocent receiver that happens to have a Sequence Key in common with a traitor that has been identified and revoked beforehand. If the device is known to be traitorous, all its Sequence Keys will have been revoked and are thus currently identifiable by the SKB as compromised. A traitorous receiver will thus proceed through all its available Sequence Keys without finding a valid one.

Thus, in step 204 of a preferred embodiment, the invention checks to see if the end of the Sequence Key list has been reached (more generally, the invention checks to see if there are no additional Sequence Keys available from the assigned set). If so, then in step 208 the receiver is traitorous according to the current SKB and the protected content is not usefully decrypted, and the invention ends. However, if additional Sequence Keys exist in the list, then the invention proceeds to step 206, where in a preferred embodiment the selected Sequence Key is deemed to be a Link Key and is used to get the next Sequence Key in the linked list of Sequence Keys. This next Sequence Key is selected as a candidate replacement for the compromised Sequence Key, and the invention returns to step 200 to check to see if it has been compromised. (Note that in the general case, the invention can select a candidate replacement for the compromised Sequence Key from a set of available Sequence Keys in any order, even randomly). Thus, an innocent receiver that happens to have a Sequence Key in common with an identified traitor is not immediately deemed traitorous but is instead allowed to employ a renewal or replacement valid Sequence Key.

Sets of Sequence Keys are assigned to individual devices by the license agency out of a matrix of keys. The licensing agency will generate Sequence Keys organized in a large matrix. The matrix preferably has 256 columns and not more than 65,536 rows. Each cell in the matrix is a different Sequence Key. A single receiver device has one key in each column. Thus, each device has 256 Sequence Keys in this example. In this respect, Sequence Keys are somewhat analogous to the CPRM technology Media Keys.

The licensing agency assigns the Sequence Key Blocks to be used with protected files. Sequence Key Blocks are similar to the CPRM Media Key Blocks, but important differences exist, arising both from the use different ciphers (preferably AES instead of C2) and from unique considerations of specific attacks that could be employed against Sequence Key lists. However, unlike MKBs, the SKBs are preferably not part of the fundamental cryptographic protection of the content. The fundamental protection of AACS is the Media Key. In a preferred embodiment of the present invention, the SKB merely allows different variants of the Media Key to be calculated by different devices.

Figure 3:
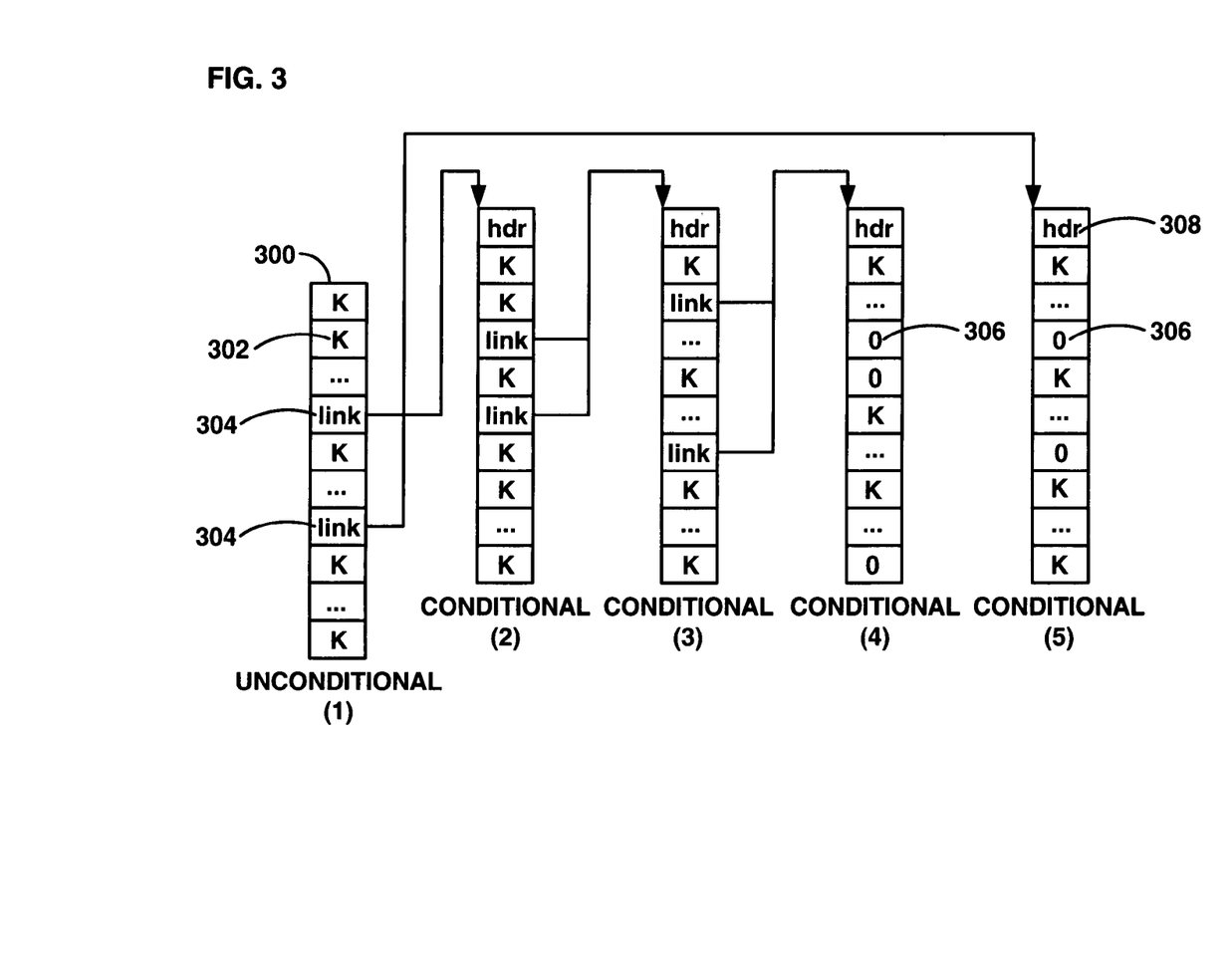
FIG. 3 is a diagram of a Sequence Key Block (SKB), according to a preferred embodiment of the present invention.

Referring now to FIG. 3, a diagram of a Sequence Key Block (SKB) according to a preferred embodiment of the present invention is shown. The SKB begins with a first column 300, called the "unconditional" column. This column will have an encryption of the output key 302 (denoted "K" in the figure) in every uncompromised Sequence Key (to be precise, it is encrypted in a key derived from the Sequence Key, not the Sequence Key itself). Devices that do not have compromised keys in that column immediately decrypt the output key, and they are done. Devices, both innocent and otherwise, that do have compromised keys instead preferably decrypt a key called a Link Key 304 that allows them to process a further column in the SKB. To process the further column, such devices need both the Link Key and their Sequence Key in that column. Thus the subsequent columns are called "conditional" columns because they can only be processed by the device if it had been given the necessary Link Key in a previous column.

The conditional columns are produced the general same way as the first column, i.e. they will have an encryption of the output key in every uncompromised Sequence Key. Devices with a compromised key will get a further Link Key 304 instead of the output key. However, after some number of columns (depending on the actual number of compromised keys), the license agency will know that only compromised devices are getting the Link Key, because all innocent devices would have found the output key in this column or a previous column. At this point, rather than encrypting a Link Key, the agency simply encrypts a 0 (item 306), and the SKB is complete.

How do the devices know they have a Link Key 304 versus the output key 302? The short answer is they do not, at least not at first. Each conditional column preferably has a header 308 of known data (e.g. the hexademical value DEADBEEF is often used) encrypted in the Link Key 304 for that column. The device decrypts the header 308 with the key it currently has. If the header 308 decrypts correctly, the device knows it has a Link Key 304 and processes the column. If it does not decrypt correctly, the device knows it has either the output key 302 or a Link Key 304 for a further column. When it reaches the end of the SKB, it knows it must have an output key 302. Note that this device logic allows the license agency to send different populations of devices to different columns by having more than one Link Key 304 output from a single column. For example, in the figure, column (1) links to both column (2) and column (5). This flexibility can help against certain types of attacks.

A unique consideration for Sequence Key lists arises from the following attack scenario. Suppose a coalition of hackers is formed that includes one identified and revoked traitor, and at least one other receiver that has not been revoked. The known traitor's first Sequence Key is used on a current SKB, and a Link Key 304 results because that Sequence Key is compromised. The invention then moves to the next column in the SKB and tries to determine if it's dealing with an innocent receiver that merely happens to have a compromised key in common with a traitor. However, instead of using the known traitor's next Sequence Key (which would lead to yet another Link Key 304 and eventually to a 0), the coalition now employs the other, unrevoked, receiver's Sequence Key along with the Link Key 304 from the previous column. In this attack and related variants, the possibility exists that the coalition would fool the system and gain access to the protected content in a way that would confound subsequent tracing of all the traitors. To guard against this scenario, the key matrix from which SKBs are generated is preferably subdivided into sub-populations small enough to allow deterministic identification of all traitors in a coalition comprising an identified revoked traitor and new "turncoats" that have not yet been identified and revoked by a given SKB. All traitor tracing schemes used in this scenario are within the scope of this invention. Similarly, SKB subdivision and population management is also employed against scenarios in which candidate Sequence Keys are not selected by proceeding through a set of Sequence Keys in any particular order.

Although the invention has been described above as producing a single correct cryptographic answer enabling access to protected content, in the broader case, there is not just a single output key, but multiple output keys termed Variant Data. Calculation of the Media Key Variant Data using Sequence Keys is now described.

Each AACS-compliant device capable of playing pre-recorded content is given a set of secret Sequence Keys when manufactured. These are in addition to the Device Keys that all AACS devices require. These Sequence Keys are provided by the license agency and are for use in processing the Sequence Key Block. The result of the calculation is Variant Data which is then combined with the Media Key from the Media Key Block to generate the Media Key Variant. Key sets may either be unique per device, or used commonly by multiple devices.

In a preferred embodiment, each device receives 256 64-bit Sequence Keys, which are referred to as $K_{s\_i}$ (i=0, 1, . . . , 255). For each Sequence Key there is an associated Column and Row value, referred to as $C_{s\_i}$ and $R_{s\_i}$ (i=0, 1, . . . , n−1) respectively. Column and Row values start at 0. For a given device, no two Sequence Keys will have the same associated Column value (in other words, a device will have at most one Sequence Key per Column). It is possible for a device to have some Sequence Keys with the same associated Row values.

A device uses a Sequence Key $K_{s\_i}$ together with the Media Key $K_m$ to calculate the Media Sequence Key $K_{ms\_i}$ as follows:

$$K_{ms}=\text{AES\_G}(K_m, K_{s\_i} || 0000000000000000_{16})$$

AES is the American Encryption Standard, a block cipher adopted as an encryption standard by the U.S. government. AES is described in detail in National Institute of Standards and Technology (NIST), Advanced Encryption Standard (AES), FIPS Publication 197, Nov. 26, 2001, and National Institute of Standards and Technology (NIST), Recommendation for Block Cipher Modes of Operation—Methods and Techniques, NIST Special Publication 800-38A, 2001 Edition. See also the AES common book, Advanced Access Content System: Introduction and Common Cryptographic Elements.

AES_G is a one-way function defined using the AES cipher. The AES-based one-way function result is calculated as:

$$\text{AES\_G}(x_1, x_2) = \text{AES\_128D}(x_1, x_2) \text{ XOR } x_2.$$

where XOR is the bitwise exclusive-OR function. AES_G is specified in the AES common book, in section 2.1.3.

AES_ECBD is the AES decrypt function in electronic codebook mode (AES Electronic CodeBook Decrypt). In this mode, the cipher treats each 128-bit cipher text block as a word to be deciphered independently of any that came before or any that come after, as if it were looking it up in a codebook. When the cipher is used in this way, a change to one block of the cipher text only affects decryption of that block. Contrast this with AES in cipher block chaining mode, in which each cipher text block is combined with a value computed while deciphering the previous block in order to decipher it. When the cipher is operated in cipher block chaining mode, a change to any block of the cipher text affects decryption of all subsequent blocks in the chain. AES_ECBD (referred to as AES_128D(k, d)) is specified in the AES common book, in section 2.1.1.

The Sequence Keys thus serve a similar role that the Device Keys serve in CPRM, i.e. the device does not use its Sequence Key directly to decrypt, but instead it combines it with the Media Key first as shown above. That means that a given SKB is associated with a given MKB (because the SKB depends on the Media Key for correct processing). A device preferably treats its Sequence Keys as highly confidential, and their associated Row values as confidential, as defined in the AACS license agreement.

The SKB is generated by the license agency and allows all compliant devices, each using their set of secret Sequence Keys and the Media Key, to calculate the Variant Data, $D_v$, which in turn allows them to calculate the Media Key Variant. If a set of Sequence Keys is compromised in a way that threatens the integrity of the system, an updated SKB can be released that causes a device with the compromised set of Sequence Keys to calculate invalid Variant Data. In this way, the compromised Sequence Keys are "revoked" by the new SKB.

An SKB is formatted as a sequence of contiguous Records. Each Record begins with a one-byte Record Type field, followed by a three-byte Record Length field. The Record Type field value indicates the type of the Record, and the Record Length field value indicates the number of bytes in the Record, including the Record Type and the Record Length fields themselves. Record lengths are always multiples of 4 bytes. The Record Type and Record Length fields are never encrypted. Subsequent fields in a Record may be encrypted, depending on the Record Type.

Using its Sequence Keys, a device calculates $D_v$ by processing Records of the SKB one-by-one, in order, from first to last. Except where explicitly noted otherwise, a device must process every Record of the SKB. The device must not make any assumptions about the length of Records, and must instead use the Record Length field value to go from one Record to the next. If a device encounters a Record with a Record Type field value it does not recognize, it ignores that Record and skips to the next. For some Records, processing will result in the calculation of a $D_v$ value. Processing of subsequent Records may update the $D_v$ value that was calculated previously. After processing of the SKB is completed, the device uses the most recently calculated $D_v$ value as the final value for $D_v$.

If a device correctly processes an SKB using Sequence Keys that are revoked by that SKB, the resulting final $D_v$ will have the special value $000000000000000000_{16}$. This special value will never be an SKB's correct final $D_v$ value, and can therefore always be taken as an indication that the device's Sequence Keys are revoked. Device behavior in this situation is defined by the particular implementation. As an example, a device could exhibit a special diagnostic code, as helpful information to a service technician.

The remaining portion of this application describes in detail a particular implementation of the present invention, including various formats likely to be followed by the AACS license agency. However, the present invention is not limited to this particular implementation.

Figure 4:
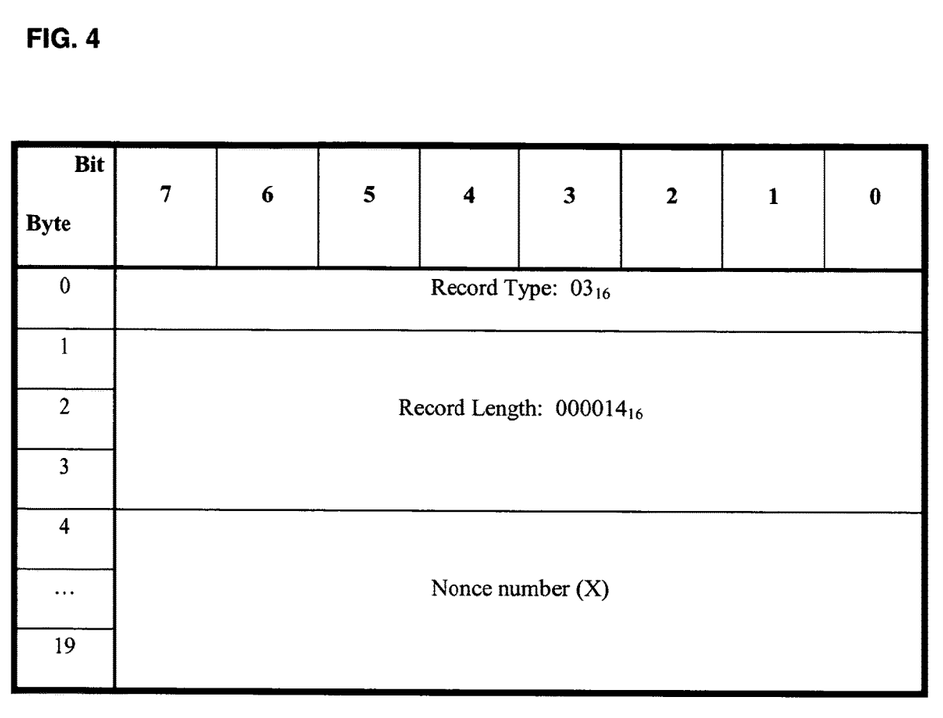
FIG. 4 is a diagram of a Nonce Record format, according to an embodiment of the present invention.

Referring now to FIG. 4, a Nonce Record format is shown according to an embodiment of the present invention. The nonce number X is used in the Variant Data calculation as described below. The nonce record will always precede the Calculate Variant Data Record and the Conditionally Calculate Variant Data Records in the SKB, although it may not immediately precede them.

Figure 5:
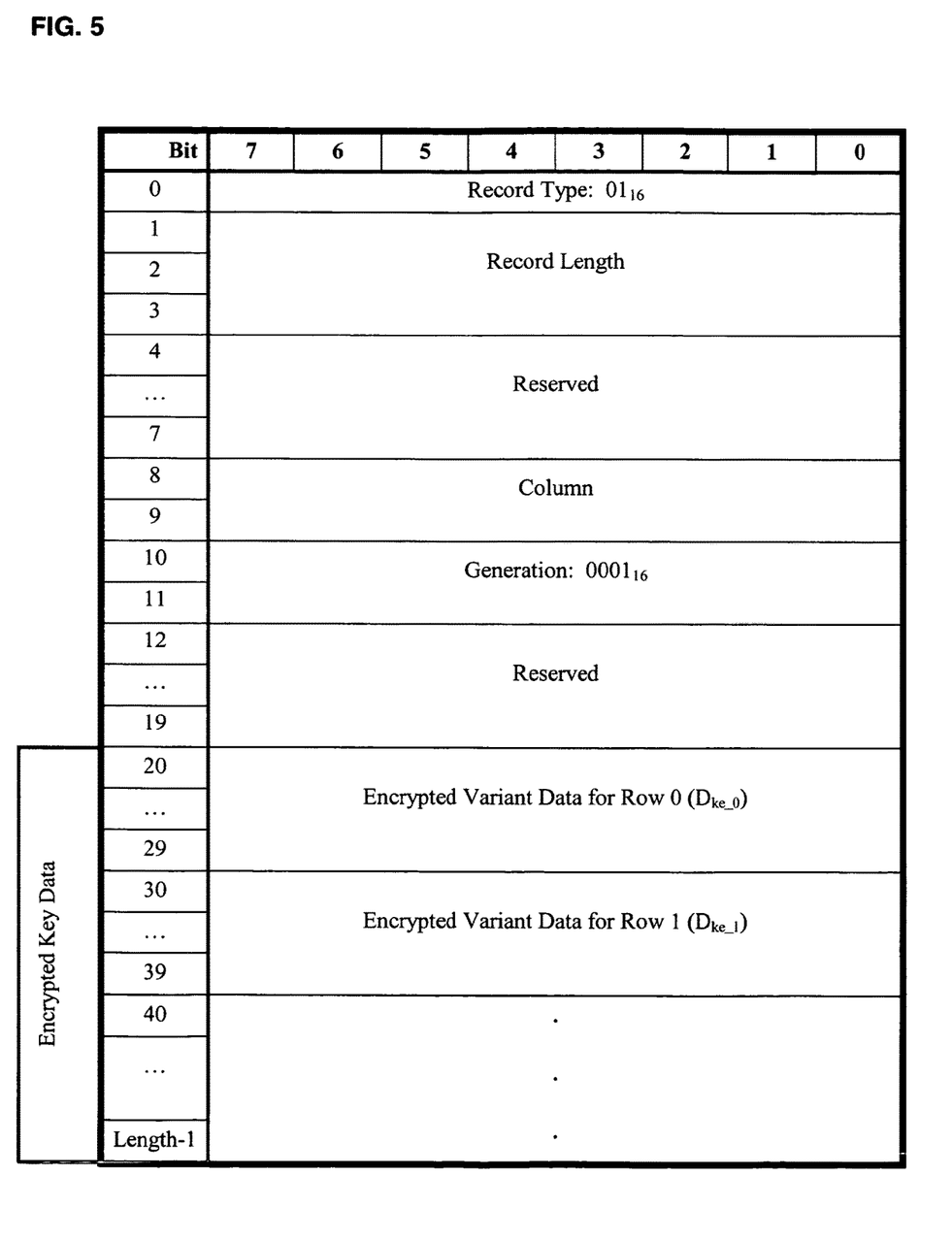
FIG. 5 is a diagram of a Calculate Variant Data Record format, according to an embodiment of the present invention.

Referring now to FIG. 5, a Calculate Variant Data Record format is shown according to an embodiment of the present invention. A properly formatted SKB will have exactly one Calculate Variant Data Record. Devices must ignore any Calculate Variant Data Records encountered after the first one in an SKB. The use of the reserved fields is currently undefined, and they are ignored. The Generation field will contain $0001_{16}$ for the first generation. The Column field indicates the associated Column value for the Sequence Key to be used with this Record, as described below. Bytes 20 and higher contain Encrypted Key Data (possibly followed by some padding bytes at the end of the Record, not shown in FIG. 5). The first ten bytes of the Encrypted Key Data correspond to Sequence Key Row 0, the next ten bytes correspond to Sequence Key Row 1, and so forth.

Before processing the Record, the device checks that both of the following conditions are true: Generation==$000001_{16}$ and the device has a Sequence Key with associated Column value $C_{d\_1}$==Column, for some i.

If either of these conditions is false, the device ignores the rest of the Record.

Otherwise, using the value i from the condition above, the value X from the Nonce Record, and $r=R_{d\_i}$, $c=C_{d\_i}$, the device calculates:

$$D_v = [AES\_G(K_{ms\_i}, X \text{ XOR } f(c,r))]_{msb\_80} \text{ XOR } D_{ke\_r}$$

where $K_{ms\_i}$ is the device's $i^{th}$ Media Sequence Key's value and $D_{ke\_r}$ is the 80-bit value starting at byte offset r×10 within the Record's Encrypted Key Data. f(c,r) represents the 128-bit value:

$$f(c,r) = 0000_{16} \| c \| 0000_{16} \| r \| 0000000000000000_{16}$$

where c and r are left-padded to lengths 16 bits, by prepending zero-valued bits to each as needed. The resulting $D_v$ becomes the current Variant Data value.

It is not necessary for a first generation device to verify that Record Length is sufficient to index into the Encrypted Key Data. First generation devices are assured that the Encrypted Key Data contains a value corresponding to their Device Key's associated Row value.

Figure 6:
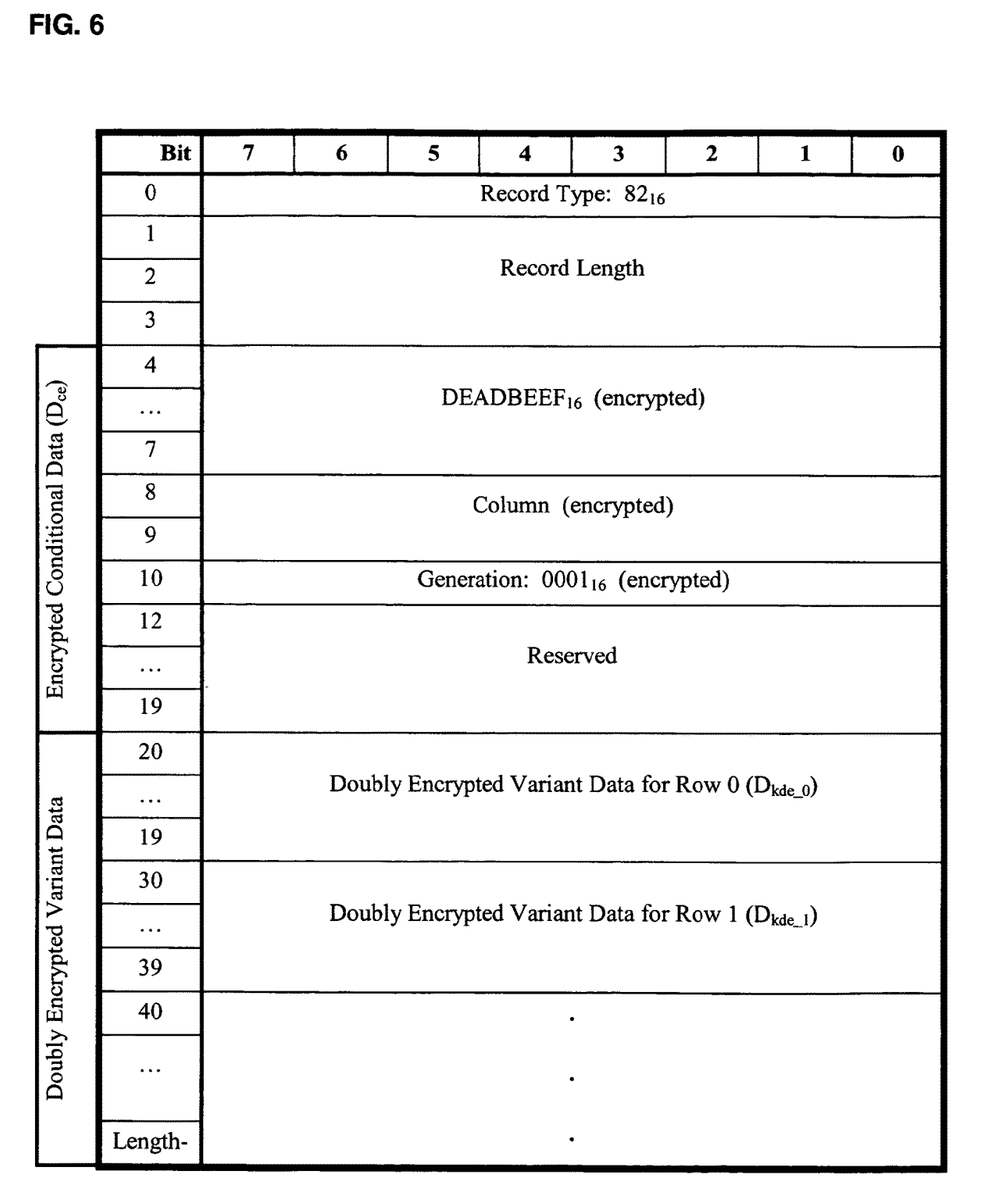
FIG. 6 is a diagram of a Conditionally Calculate Variant Data Record format, according to an embodiment of the present invention.

Referring now to FIG. 6, a Conditionally Calculate Variant Data Record format is shown, according to an embodiment of the present invention. A properly formatted SKB may have zero or more Conditionally Calculate Media Key Records. Bytes 4 through 19 of the Record contain Encrypted Conditional Data ($D_{ce}$). If decrypted successfully, as described below, bytes 4 through 7 contain the value $DEADBEEF_{16}$, bytes 8-9 contains the associated Column value for the Device Key to be used with this Record, and bytes 10-11 contain a Generation value of $0001_{16}$ for the first generation. Bytes 20 and higher contain Doubly Encrypted Variant Data (possibly followed by some padding bytes at the end of the Record, not shown in FIG. 6). The first ten bytes of the Doubly Encrypted Key Data correspond to Sequence Key Row 0, the next ten bytes correspond to Sequence Key Row 1, and so forth.

Upon encountering a Conditional Calculate Variant Data Record, the device first calculates its current Media Key Variant, as follows:

$$K_{mv} = AES\_G(K_m, D_v \| 0000000000000_{16})$$

where $D_v$ is its current Variant Data calculated from a previous Calculate Variant Data Record or Conditional Calculate Variant Data Record.

Using its current $K_{mv}$ value, the device calculates Conditional Data ($D_c$) as:

$$D_c = AES\_ECBD(K_{mv}, D_{ce}).$$

Before continuing to process the Record, the device checks that all of the following conditions are true: $[D_c]_{msb\_32}$==$DEADBEEF_{16}$ and $[D_c]_{79:64}$==$0001_{16}$ and the device has a Sequence Key with associated Column value $C_{d\_i}$==$[D_c]_{95:80}$ for some i.

If any of these conditions is false, the device ignores the rest of the Record.

Otherwise, using the value i from the condition above, X from the Nonce Record, the device's current Variant Data $D_v$, and $r=R_{d\_i}$, $c=C_{d\_i}$, the device calculates:

$$D_v=[AES\_G(K_{ms\_i}, X \text{ XOR } f(c,r)) \text{ XOR } D_v]_{msb\_80} \text{ XOR } D_{kde\_r}$$

where $D_{kde\_r}$ is the 80-bit value starting at byte offset r×10 within the Record's Doubly Encrypted Key Data, f(c,r) represents the 128-bit value:

$$f(c,r)=0000_{16}\|c\|0000_{16}\|r\|0000000000000000_{16}$$

where c and r are left-padded to lengths 16 bits, by prepending zero-valued bits to each as needed. The resulting $D_v$ becomes the current Variant Data value. This record is always a multiple of 4 bytes; if necessary, pad bytes are added on the end.

Figure 7:
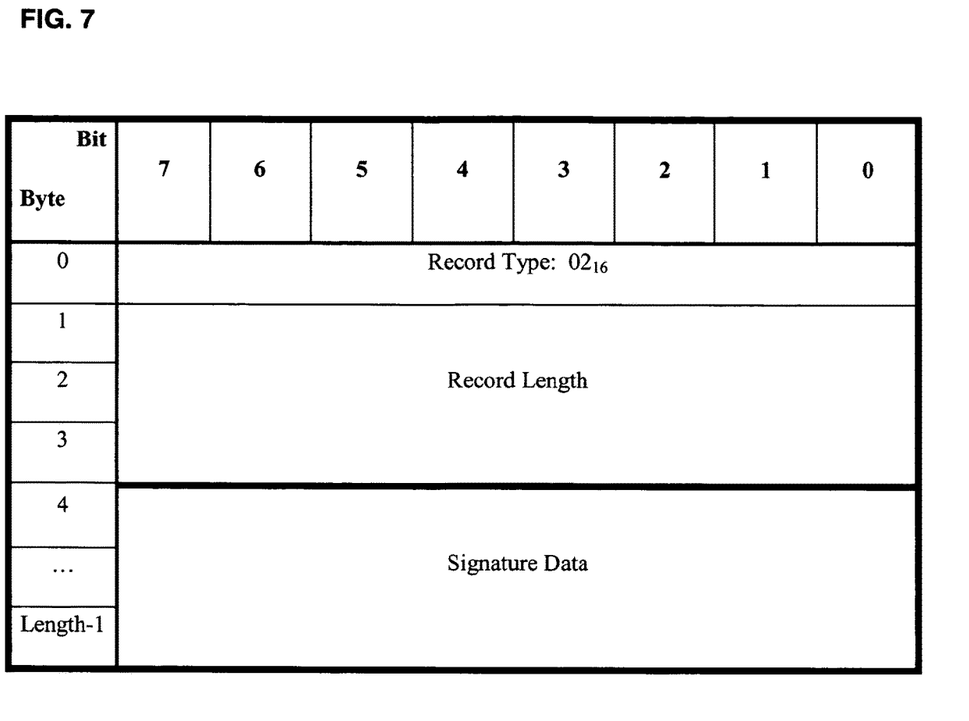
FIG. 7 is a diagram of an End of Sequence Key Block Record format, according to an embodiment of the present invention.

Referring now to FIG. 7, an End of Sequence Key Block Record format is shown, according to an embodiment of the present invention. A properly formatted SKB contains an End of Sequence Key Block Record. When a device encounters this Record it stops processing the SKB, using whatever $D_v$ value it has calculated up to that point as the final $D_v$ for that SKB.

The End of Sequence Key Block Record contains the license agency's signature on the data in the Sequence Key Block up to, but not including, this record. Devices may ignore the signature data. However, if any device checks the signatures and determines that the signature does not verify or is omitted, it must refuse to use the Variant Data. The length of this record is always a multiple of 4 bytes.

Regarding the calculation of the Media Key Variant from the Variant Data, when the device has finished processing the SKB, and if it has not been revoked, it will have an 80-bit valid Variant Data $D_v$. The device calculates the Media Key Variant from the Variant Data as follows:

$$K_{mv}=AES\_G(K_m, D_v\|000000000000_{16})$$

In addition, the low-order 10 bits of the Variant Data identify the Variant Number for the device to use in playing the content, from 0 to 1023. This number usually denotes the particular Title Key file the device should use to decrypt the content, although the meaning and use of the Variant Number is format-specific.

A general purpose computer is programmed according to the inventive steps herein. The invention can also be embodied as an article of manufacture—a machine component—that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device.

While the invention has been described with respect to illustrative embodiments thereof, it will be understood that various changes may be made in the apparatus and means herein described without departing from the scope and teaching of the invention. Accordingly, the described embodiment is to be considered merely exemplary and the invention is not to be limited except as specified in the attached claims.

What is claimed is:

1. A method comprising:
   receiving encrypted content at a receiver, the receiver having an associated plurality of sequence keys;
   receiving a sequence key block comprising link keys at the receiver, the sequence key block being formulated to cryptographically revoke sequence keys associated with one or more traitorous receivers;
   selecting a first sequence key from the plurality of sequence keys;
   determining a first link key by applying the first sequence key to the sequence key block;
   traversing the sequence key block using the first link key and the remaining plurality of sequence keys, wherein traversing the sequence key block comprises:
   decrypting a first subset of the sequence key block using the first link key to obtain a second link key from the sequence key block,
   decrypting a second subset of the sequence key block with the second link key to obtain a third link key from the sequence key block, with which decryption of the sequence key block is repeated; and
   determining from the traversal that at least one of the remaining plurality of sequence keys has been revoked.

2. The method of claim 1, further comprising:
   determining from the traversal that all of the remaining plurality of sequence keys have been revoked.

3. The method of claim 2, further comprising: identifying the receiver as traitorous based on all of the remaining plurality of sequence keys being revoked.

4. The method of claim 1, wherein the encrypted content comprises a file or a file segment.

5. The method of claim 1, wherein the encrypted content comprises a cryptographic key, text, audio, an image, video, a multimedia presentation, music, a movie, an operating system, a video game, or a software application.

6. The method of claim 1, wherein the plurality of sequence keys are related by a linked list.

7. The method of claim 1, wherein traversing the sequence key block comprises determining a second link key by applying the first link key and a second sequence key of the plurality of sequence keys to the sequence key block.

8. The method of claim 2, wherein determining that all of the remaining plurality of sequence keys have been revoked comprises extracting a predetermined value from the sequence key block.

9. The method of claim 3, further comprising disabling the receiver as traitorous.

10. The method of claim 3, further comprising revoking each of the plurality of sequence keys.

11. A computer program product for traitor tracing, the computer program product comprising a non-transitory computer readable storage medium having program instructions embodied therewith, the program instructions executable by a processor to cause the processor to perform a method comprising:
   receiving encrypted content at a receiver, the receiver having an associated plurality of sequence keys;
   receiving a sequence key block comprising link keys at the receiver, the sequence key block being formulated to cryptographically revoke sequence keys associated with one or more traitorous receivers;
   selecting a first sequence key from the plurality of sequence keys;
   determining a first link key by applying the first sequence key to the sequence key block;

traversing the sequence key block using the first link key and the remaining plurality of sequence keys, wherein traversing the sequence key block comprises:

decrypting a first subset of the sequence key block using the first link key to obtain a second link key from the sequence key block, decrypting a second subset of the sequence key block with the second link key to obtain a third link key from the sequence key block, with which decryption of the sequence key block is repeated; and determining from the traversal that at least one of the remaining plurality of sequence keys has been revoked.

12. The computer program product of claim 11, the method further comprising:

determining from the traversal that all of the remaining plurality of sequence keys have been revoked.

13. The computer program product of claim 12, the method further comprising: identifying the receiver as traitorous based on all of the remaining plurality of sequence keys being revoked.

14. The computer program product of claim 11, wherein the encrypted content comprises a file or a file segment.

15. The computer program product of claim 11, wherein the encrypted content comprises a cryptographic key, text, audio, an image, video, a multimedia presentation, music, a movie, an operating system, a video game, or a software application.

16. The computer program product of claim 11, wherein the plurality of sequence keys are related by a linked list.

17. The computer program product of claim 11, wherein traversing the sequence key block comprises determining a second link key by applying the first link key and a second sequence key of the plurality of sequence keys to the sequence key block.

18. The computer program product of claim 12, wherein determining that all of the remaining plurality of sequence keys have been revoked comprises extracting a predetermined value from the sequence key block.

19. The computer program product of claim 13, the method further comprising disabling the receiver as traitorous.

20. The computer program product of claim 13, the method further comprising revoking each of the plurality of sequence keys.

* * * * *